US012643633B2

(12) United States Patent
Roy-Bernier

(10) Patent No.: US 12,643,633 B2
(45) Date of Patent: Jun. 2, 2026

(54) FLOTATION BODY FOR PERSONAL WATERCRAFT

(71) Applicant: TAIGA MOTORS INC., Lasalle (CA)

(72) Inventor: Clovis Roy-Bernier, Montreal (CA)

(73) Assignee: TAIGA MOTORS INC., Lasalle (CA)

( * ) Notice: Subject to any disclaimer, the term of this patent is extended or adjusted under 35 U.S.C. 154(b) by 621 days.

(21) Appl. No.: 17/982,989

(22) Filed: Nov. 8, 2022

(65) Prior Publication Data

US 2023/0182864 A1 Jun. 15, 2023

Related U.S. Application Data

(60) Provisional application No. 63/265,322, filed on Dec. 13, 2021.

(51) Int. Cl.
| | |
|---|---|
| B63B 11/00 | (2006.01) |
| B60L 50/60 | (2019.01) |
| B63B 3/38 | (2006.01) |
| B63B 5/24 | (2006.01) |
| B63B 34/10 | (2020.01) |
| B63H 11/00 | (2006.01) |

(52) U.S. Cl.
CPC .............. B63B 11/00 (2013.01); B60L 50/66 (2019.02); B63B 5/24 (2013.01); B63B 34/10 (2020.02); B63H 11/00 (2013.01); *B60L 2200/32* (2013.01); *B63B 2003/382* (2013.01)

(58) Field of Classification Search
CPC .......... B63B 11/00; B63B 5/24; B63B 34/10; B63B 2003/382; B60L 50/66; B60L 2200/32; B63H 11/00; B63H 21/17
See application file for complete search history.

(56) References Cited

U.S. PATENT DOCUMENTS

| | | | | |
|---|---|---|---|---|
| 3,405,677 A | * | 10/1968 | Smith ..................... | B63B 32/10 |
| | | | | 114/55.53 |
| 3,456,613 A | * | 7/1969 | Smith ..................... | B63B 32/10 |
| | | | | 440/6 |
| 3,989,002 A | * | 11/1976 | Peterson ................. | B63B 34/10 |
| | | | | 440/87 |
| 4,616,168 A | * | 10/1986 | Nishida ..................... | B63J 3/04 |
| | | | | 320/DIG. 34 |
| 5,036,789 A | * | 8/1991 | Kelly ......................... | B63B 5/24 |
| | | | | 114/357 |
| 6,681,712 B1 | * | 1/2004 | Andreae ................. | B63B 34/10 |
| | | | | 114/343 |

(Continued)

OTHER PUBLICATIONS

Free Form Unveils World's First Electric Freeride Jet Ski—The Watercraft Journal 2017 (Year: 2017).*

(Continued)

*Primary Examiner* — Brian Christopher Delrue
(74) *Attorney, Agent, or Firm* — Norton Rose Fulbright Canada LLP

(57) ABSTRACT

A personal watercraft includes a hull having a bottom wall and a side wall extending upwardly from the bottom wall. The bottom and side walls define an interior volume of the hull. A battery pack includes a plurality of battery modules. The battery pack is positioned within the interior volume. A flotation body is positioned within the interior volume between the battery pack and at least one of the bottom wall of the hull and the side wall of the hull.

20 Claims, 6 Drawing Sheets

(56)                References Cited

U.S. PATENT DOCUMENTS

| | | | | |
|---|---|---|---|---|
| 6,857,918 | B1 * | 2/2005 | Lebreux | B63B 34/10 |
| | | | | 440/6 |
| 6,890,224 | B2 * | 5/2005 | McCann | B63J 2/06 |
| | | | | 440/38 |
| 8,979,603 | B1 * | 3/2015 | Rioux | B63H 21/36 |
| | | | | 440/88 L |
| 9,321,516 | B1 * | 4/2016 | Lafreniere | B63H 21/20 |
| 9,359,044 | B2 * | 6/2016 | Langelaan | B63H 1/16 |
| 9,517,826 | B1 * | 12/2016 | Leblond | B63H 11/113 |
| 10,597,118 | B2 * | 3/2020 | Montague | B63B 32/10 |
| 10,946,939 | B1 * | 3/2021 | Montague | B63B 32/60 |
| 10,981,633 | B2 * | 4/2021 | Lind | B63B 32/10 |
| 11,084,556 | B1 * | 8/2021 | Montague | B63H 21/17 |
| 11,529,878 | B2 * | 12/2022 | Gagnon | B63H 21/17 |
| 11,608,144 | B2 * | 3/2023 | Werner | B63B 1/042 |
| 11,712,974 | B2 * | 8/2023 | Gagnon | B63H 21/17 |
| | | | | 114/101 |
| 11,878,775 | B2 * | 1/2024 | Montague | B63H 21/17 |
| 11,884,174 | B2 * | 1/2024 | Moloney | B60L 58/13 |
| 12,110,087 | B1 * | 10/2024 | Broughton | B63H 20/007 |
| 12,115,868 | B2 * | 10/2024 | Gagnon | B60L 50/66 |
| 2003/0061975 | A1 * | 4/2003 | Nadeau | B63B 25/002 |
| | | | | 114/55.53 |
| 2004/0242088 | A1 * | 12/2004 | McCann | B63H 11/08 |
| | | | | 440/6 |
| 2005/0181686 | A1 * | 8/2005 | Grimmeisen | B63H 21/17 |
| | | | | 440/6 |
| 2011/0201238 | A1 * | 8/2011 | Rott | B63B 32/10 |
| | | | | 340/13.25 |
| 2015/0104985 | A1 * | 4/2015 | Langelaan | B63H 1/16 |
| | | | | 441/74 |
| 2015/0288197 | A1 * | 10/2015 | Choi | H02J 7/005 |
| | | | | 320/137 |
| 2015/0380718 | A1 * | 12/2015 | Grass | H01M 50/521 |
| | | | | 29/623.5 |
| 2018/0072383 | A1 * | 3/2018 | Montague | B63B 32/64 |
| 2022/0204138 | A1 * | 6/2022 | Montague | B63B 1/246 |
| 2022/0340021 | A1 * | 10/2022 | Gagnon | B63H 21/17 |
| 2022/0363136 | A1 * | 11/2022 | Bruneau | H02P 3/00 |
| 2023/0075946 | A1 * | 3/2023 | Gagnon | B60L 50/64 |

OTHER PUBLICATIONS

Spark Up, How to Remove Top Deck + Replace Battery + Replace Starter Relay Seadoo Spark, https://www.youtube.com/watch?v=0GS2hxVu5ng&t=632s, Oct. 27, 2019, 8:00 min to 8:29 min, Accessed on Nov. 11, 2022.

ISO, Small craft—Personal watercraft—Construction and system installation requirements, International Standard ISO 13590, Second Edition, Dec. 15, 2003, Switzerland.

* cited by examiner

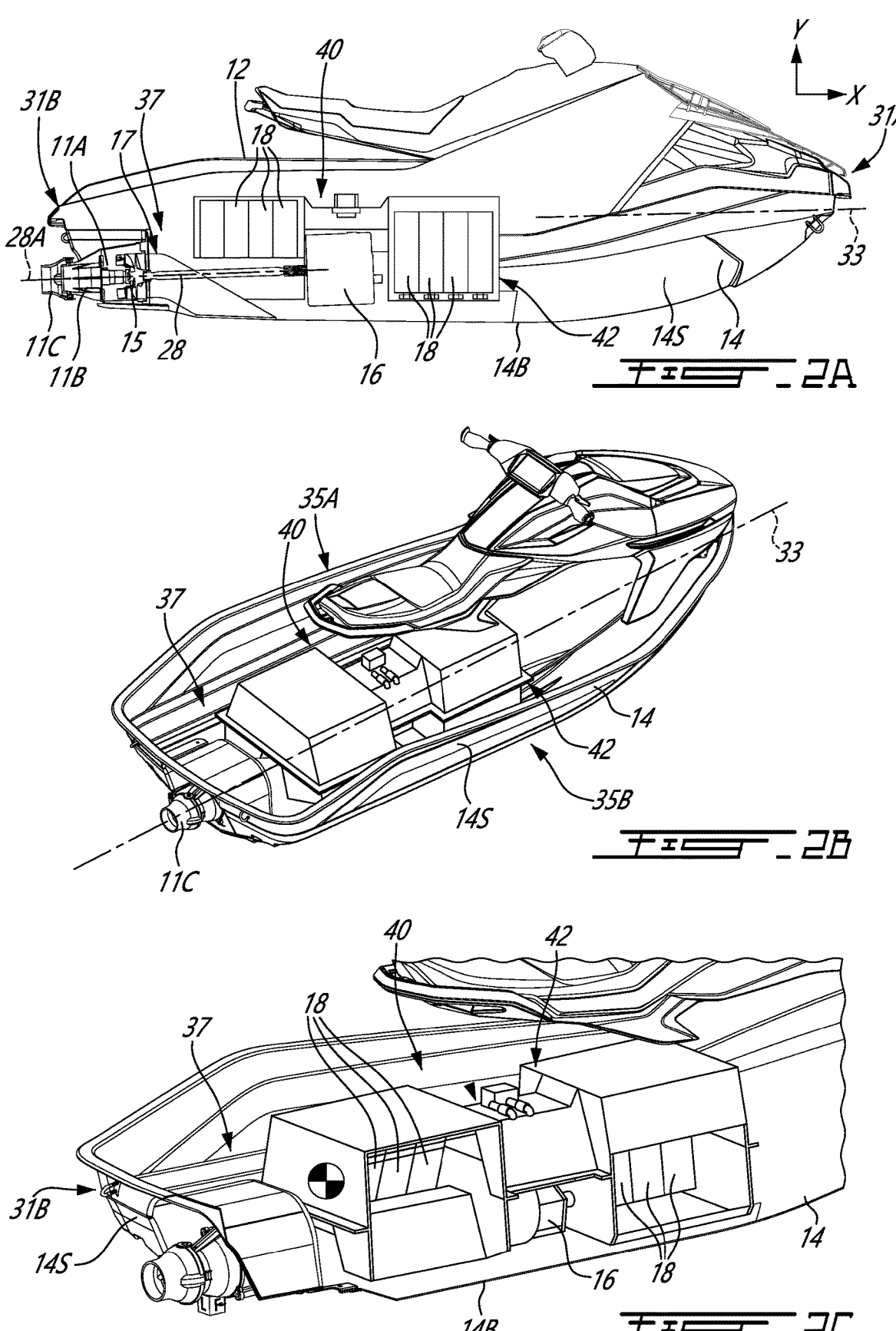

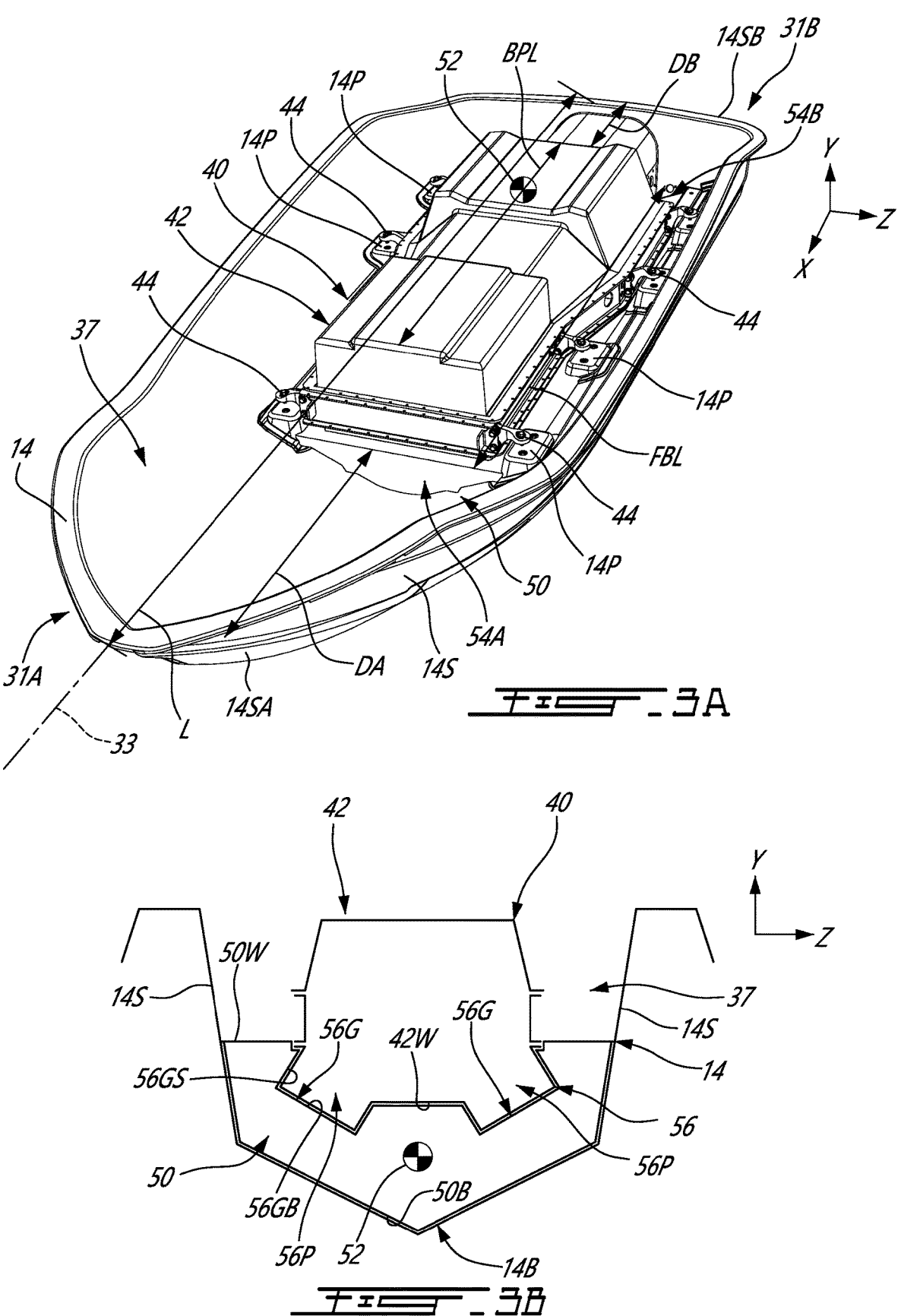

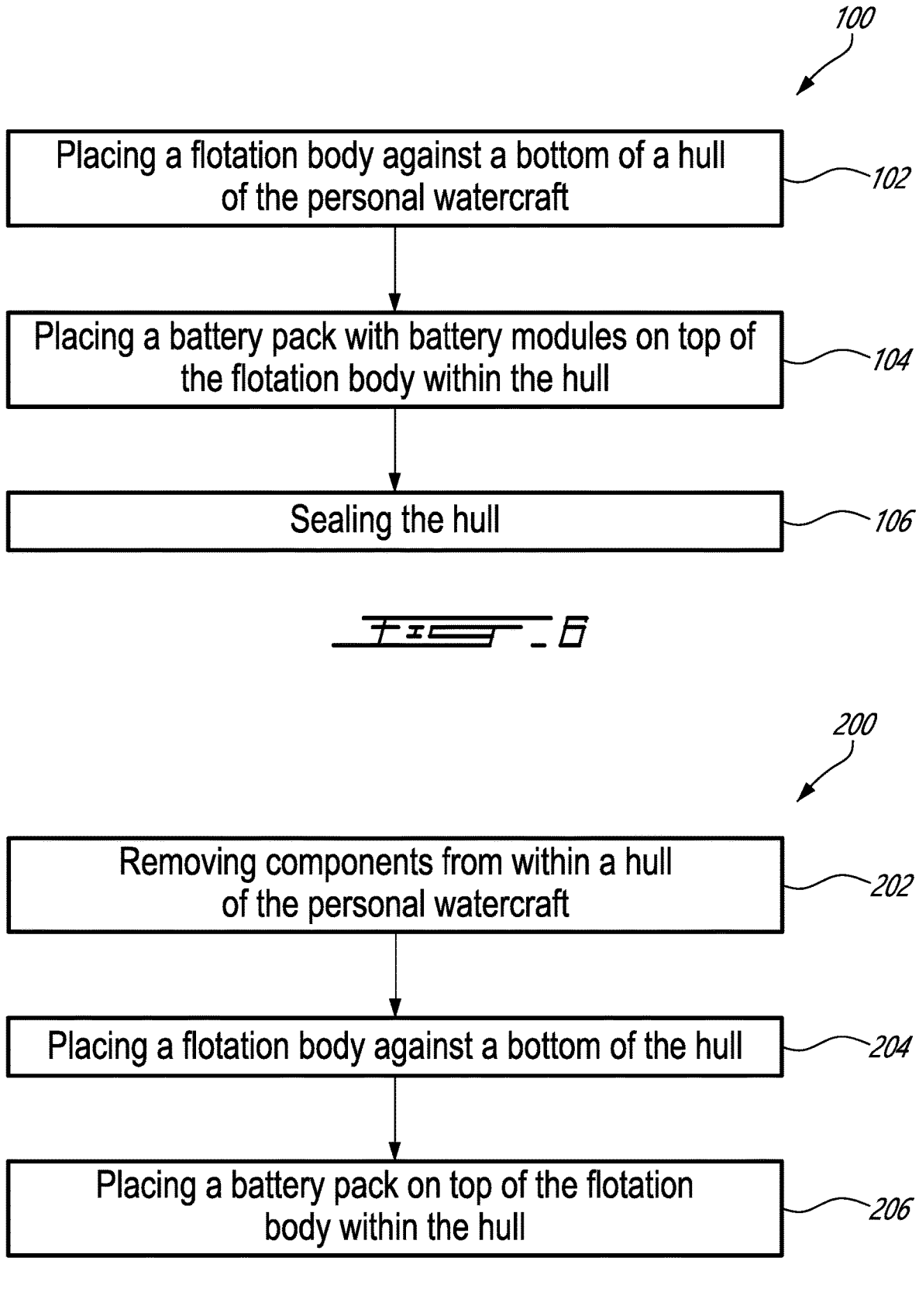

*100*

Placing a flotation body against a bottom of a hull of the personal watercraft —*102*

Placing a battery pack with battery modules on top of the flotation body within the hull —*104*

Sealing the hull —*106*

Removing components from within a hull of the personal watercraft —*202*

Placing a flotation body against a bottom of the hull —*204*

Placing a battery pack on top of the flotation body within the hull —*206*

FIG. 7

FLOTATION BODY FOR PERSONAL WATERCRAFT

CROSS-REFERENCE TO RELATED APPLICATION(S)

This application claims priority from U.S. Provisional Patent Application No. 63/265,322, filed Dec. 13, 2021, which is incorporated by reference in its entirety herein.

TECHNICAL FIELD

The application relates generally to watercraft and, more particularly, to watercraft using an electric power source.

BACKGROUND

It is often desirable for personal watercraft to at least partially stay afloat in the event of a breach in the hull which may result in the interior space of the hull filling with water. The breach in the hull may be caused by damage to the hull, and may also be caused by user error (e.g., by removing the drain plugs). When the hull floods, the personal watercraft will lose its primary source of buoyancy.

Additional components may be used to provide a minimum level of buoyancy in the case of a breached hull. While these components allow the personal watercraft to float in the event of a breached hull, they might not allow the personal watercraft to assume a useful orientation in the water and may cause other useful components of the personal watercraft (e.g., seat, handles, foot rests, dashboard) to be submerged and not accessible to a user.

SUMMARY

There is disclosed a personal watercraft, comprising: a hull having a bottom wall and a side wall extending upwardly from the bottom wall, the bottom and side walls defining an interior volume of the hull; a battery pack including a plurality of battery modules, the battery pack positioned within the interior volume; and a flotation body positioned within the interior volume between the battery pack and at least one of the bottom wall of the hull and the side wall of the hull.

There is disclosed a personal watercraft, comprising: a hull having a bottom wall and a side wall extending upwardly from the bottom wall, the bottom and side walls defining an interior volume of the hull; a battery pack positioned within the interior volume; an electric motor powered by the battery pack; an impeller configured to be driven by the electric motor to displace the personal watercraft; and a flotation body positioned within the interior volume between the battery pack and at least one of the bottom wall and the side wall of the hull.

There is disclosed a personal watercraft, comprising: a hull extending between a bow of the personal watercraft and a stern of the personal watercraft, the hull having defining an interior volume; a battery pack including a plurality of battery modules, the battery pack positioned within the interior volume; and a flotation body positioned within the interior volume vertically between the battery pack and the hull, the flotation body having a centroid located closer to the stern than to the bow.

There is disclosed a personal watercraft, comprising: a hull defining an interior volume of the personal watercraft; a battery pack including a plurality of battery modules, the battery pack positioned within the interior volume; and a foam flotation body positioned within the interior volume between the battery pack and the hull and abutting the battery pack, the foam flotation body having at least one property to dampen vibrations from the hull.

There is disclosed a personal watercraft, comprising: a hull defining an interior volume of the personal watercraft; a battery pack including a plurality of battery modules, the battery pack positioned within the interior volume; and a flotation body positioned within the interior volume between the battery pack and the hull, the flotation body and the battery pack including complementary features to position the battery pack within the hull.

There is disclosed an emergency flotation device for a personal watercraft, comprising: a foam body positionable against a bottom wall of a hull of the personal watercraft between the bottom wall and a battery pack of the personal watercraft.

There is disclosed a personal watercraft, comprising: a hull extending between a bow of the personal watercraft and a stern of the personal watercraft, the hull having defining an interior volume; and a flotation body positioned within the interior volume, the flotation body including a bow portion located at the bow and a stern portion located at the stern.

There is disclosed a method of assembling a personal watercraft, the method comprising: placing a flotation body against a bottom of a hull of the personal watercraft; placing a battery pack with battery modules on top of the flotation body within the hull; and sealing the hull.

There is disclosed a method of repairing or modifying a personal watercraft, the method comprising: removing components from within a hull of the personal watercraft; placing a flotation body against a bottom of the hull; and placing a battery pack on top of the flotation body within the hull.

DESCRIPTION OF THE DRAWINGS

Reference is now made to the accompanying figures in which:

FIG. 2A is a cross-sectional view of the watercraft of FIG. 1, showing a configuration of a battery pack;

FIG. 2B is top perspective view of the watercraft of FIG. 1 showing the battery pack of FIG. 2A;

FIG. 2C is a cross-sectional view of part of FIG. 2B;

FIG. 3A is a top perspective view of a hull of the watercraft of FIG. 1;

FIG. 3B is a rear schematic view of an interior of the hull of the watercraft;

FIG. 6 is a flowchart of an example method for assembling the watercraft; and FIG. 7 is a flowchart of an example method for repairing or modifying the watercraft.

DETAILED DESCRIPTION

The following disclosure relates to electric watercraft, electric battery enclosures and methods for positioning electric battery modules and electric battery enclosures within an electric watercraft. Examples of electric watercraft include personal watercraft (PWCs) having a straddle seat for accommodating an operator and optionally one or more passengers.

Figure 1:
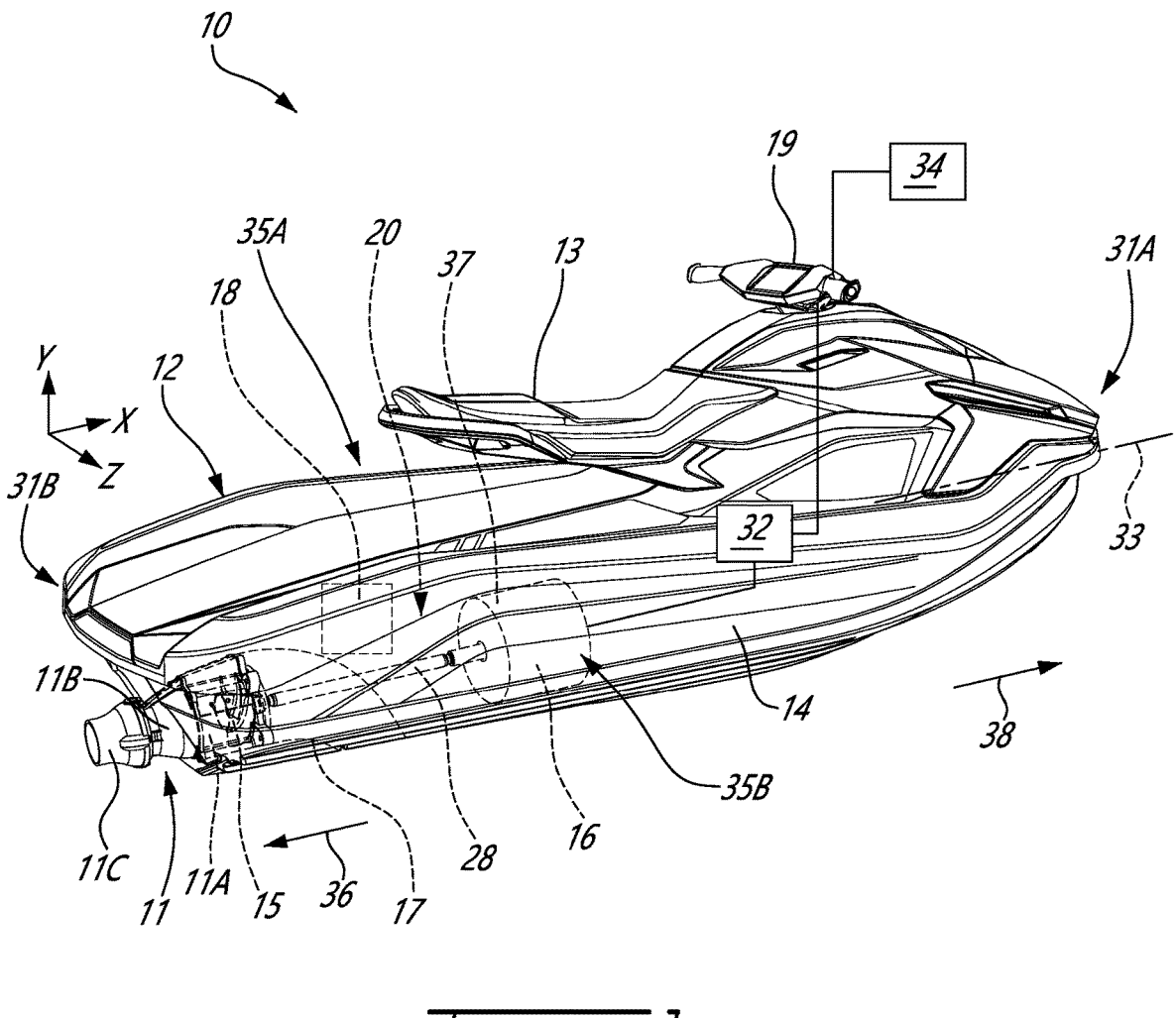
FIG. 1 is a perspective view of a watercraft.

FIG. 1 illustrates a watercraft 10 of a type preferably used for transporting one or more passengers over a body of water. The watercraft 10 is therefore sometimes referred to herein as a "personal watercraft 10" or "PWC 10". The PWC 10 of FIG. 1 is electrically powered. An upper portion of the PWC 10 is formed of a deck 12 including a straddle seat 13 for accommodating a driver of the PWC 10 and optionally one or more passengers. A lower portion of the PWC 10 is formed of a hull 14 which sits in the water. The hull 14 and the deck 12 enclose an interior volume 37 of the PWC 10 which provides buoyancy to the PCW 10 and houses components thereof. A non-limiting list of components of the PWC 10 that may be located in the interior volume 37 include an electric motor 16, one or more electric battery modules 18 or batteries, a thermal management system, and other components for an electric drive system 20 of the PWC 10. The hull 14 may also include strakes and chines which provide, at least in part, riding and handling characteristics of the PWC 10. The interior volume 37 may also include any other components suitable for use with PWC 10, such as storage compartments, for example.

The PWC 10 includes a jet propulsion system 11 to create a pressurized jet of water which provides thrust to propel the PWC 10 through the water. The jet propulsion system 11 includes an impeller 15 disposed in the water to draw water through a water intake 17 on an underside of the hull 14, with the water being directed to a jet pump 11A. Water ejected from the jet pump 11A is directed through a venturi 11B which further accelerates the water to provide additional thrust. The accelerated water jet is ejected from the venturi 11B via a pivoting steering nozzle 110 which is directionally controlled by the driver with a steering mechanism 19 to provide a directionally controlled jet of water to propel and steer the PWC 10.

The electric drive system 20 of the PWC 10 includes one or more of the electric motors 16 (referred hereinafter in the singular) drivingly coupled to the impeller 15 via a drive shaft 28. The drive shaft 28 transfers motive power from the electric motor 16 to the impeller 15. The electric drive system 20 also includes the battery modules 18 for providing electric current to the electric motor 16 and driving the electric motor 16. The operation of the electric motor 16 and the delivery of drive current to the electric motor 16 may be controlled by a controller 32 based on an actuation by the driver of an accelerator 34, sometimes referred to as a "throttle", on the steering mechanism 19, among other inputs. In various embodiments, the electric motor 16 may be a permanent magnet synchronous motor or a brushless direct current motor for example. The electric motor 16 may have a power output of between 120 and 180 horsepower, for example. The electric motor 16 may have a maximum output power of greater than 180 horsepower, for example. In an embodiment, and referring to FIG. 1, the electrical power generated by the battery modules 18 is the only source of energy provided to the electric motor 16 to drive the impeller 15 and displace the PWC 10. In an embodiment, and referring to FIG. 1, the electrical power generated by the battery modules 18 is the only source of energy that causes the PWC 10 to displace.

Referring to FIG. 1, the PWC 10 moves along a forward direction of travel 38 and a rear or aft direction of travel 36. The forward direction of travel 38 is the direction along which the PWC 10 travels in most instances when displacing. The aft direction of travel 36 is the direction along which the PWC 10 displaces only occasionally, such as when it is reversing. The PWC 10 includes a bow 31A and a stern 31B defined with respect to the aft and forward directions of the travel 36,38, in that the bow 31A is positioned ahead of the stern 31B relative to the forward direction of travel 38, and that the stern 31B is positioned astern of the bow 31A relative to the aft direction of travel 36. The PWC 10 defines a longitudinal center axis 33 that extends between the bow 31A and the stern 31B. A port side 35A and a starboard side 35B of the PWC 10 are defined on opposite lateral sides of the center axis 33. The positional descriptors "front", "aft" and "rear" and terms related thereto are used in the present disclosure to describe the relative position of components of the PWC 10. For example, if a first component of the PWC 10 is described herein as being in front of, or forward of, a second component, the first component is closer to the bow 31A than the second component. Similarly, if a first component of the PWC 10 is described herein as being aft of, or rearward of, a second component, the first component is closer to the stern 31B than the second component. The PWC 10 also includes a three-axes frame of reference that is displaceable with the PWC 10, where the Y-axis is parallel to the vertical direction, the X axis is parallel to the center axis 33, and the Z-axis is perpendicular to both the X and Y axes and defines a lateral direction between the port and starboard sides 35A,35B. Features and components are described and shown in the present disclosure in relation to the PWC 10, but the present disclosure may also be applied to different types of watercraft 10, such as other boats or other vessels, used to transport people and/or cargo.

Referring to FIGS. 2A to 2C, the hull 14 is an elongated body that extends along the center axis 33 and is symmetrical about a vertical plane extending through the center axis 33. The hull 14 has a bottom wall 14B. The bottom wall 14B is the lowermost wall of the hull 14. The bottom wall 14B defines a lowermost surface of the hull 14, and thus of the PWC 10. The hull 14 has a side wall 14S. The side wall 14S extends upwardly from the bottom wall 14B and extends around the periphery of the bottom wall 14B to define or delimit part of the interior volume 37 of the hull 14. The side wall 14S may extend upwardly from the bottom wall 14B at any suitable angle that provides the side wall 14S with a predominantly upright orientation. Different portions of the side wall 14S may extend upwardly from the bottom wall 14B at different angles. Referring to 2A to 2C, the side wall 14S and the bottom wall 14B are a single body and cooperate to define a unibody or monolithic hull 14. Such unibody or monolithic bottom and side walls 14B,14S may be formed during the manufacturing process, such as during a molding process. In an alternative embodiment, the side wall 14S is separate from the bottom wall 14B and attached to the bottom wall 14B during assembly of the hull 14. Referring to 2A to 2C, the side wall 14S is a uniform and continuous body. In an alternative embodiment, the side wall 14S is an assembly of separate segments of the side wall 14S.

The electric motor 16 is positioned within the interior volume 37 of the hull 14. The electric motor 16 may be housed in a motor compartment that is sealed from a remainder of the interior volume 37 to prevent the ingress of water or other fluids into the motor compartment. The electric motor 16 in operation rotates the drive shaft 28 and the impeller 15 about a drive shaft axis 28A. The drive shaft 28 extends in an aft or rearward direction from the electric motor 16, and the impeller 15 is located at an aft end, or at the stern 31B, of the PWC 10.

Referring to FIGS. 2A to 2C, the PWC 10 has a battery pack 40 that is positioned within the interior volume 37 defined by the hull 14 and deck 12 when the hull 14 and deck 12 are assembled together. The battery pack 40 includes a battery pack enclosure 42 which houses or contains the battery modules 18. The terms "batteries" and "battery modules" may be used interchangeably within the description. The battery modules 18 may each include a plurality of battery cells, frame elements and/or thermal management elements, among other components. The battery cells may be pouch cells, cylindrical cells and/or prismatic cells, for example. In some embodiments, the battery cells of the battery module 18 may be a rechargeable lithium ion or other type. Suitable batteries or battery modules 18 are described in U.S. patent application Ser. No. 17/091,777 entitled "Battery cooling panel for electric vehicles", the entirety of which is incorporated by reference herein. The batteries 18 may be vertically stacked, horizontally aligned or positioned in any other configuration or orientation within the battery pack enclosure 42 to achieve the desired energy density for the battery pack 40. In some embodiments, the battery pack 40 may be configured to output electric power at a voltage of between 300-400 volts, or up to 800 volts, for example.

Referring to FIGS. 3A and 3B, the PWC 10 has a flotation body 50. The flotation body 50 is positioned within the interior volume 37 and serves multiple functions, as described in more detail below. A first function of the flotation body 50 is to provide buoyancy to the PWC 10 in the event of a breach in the hull 14 that causes some or all of the interior volume 37 to fill with water. The flotation body 50 is thus an object which floats when in the water, thereby helping to keep the PWC 10 afloat if the hull 14 is breached. The flotation body 50 may therefore be referred to as an "emergency flotation device" 50 because one of its functions is to keep the PWC 10 afloat in an emergency situation (e.g. breach of the hull 14). The flotation body 50 is a three-dimensional object, with a width or lateral extent defined in a starboard-port direction along the Z-axis, a length defined in the stern-bow direction along the X-axis or along the center axis 33, and a height or thickness defined in a vertical direction along the Y-axis. In an embodiment, and referring to FIGS. 3A and 3B, the flotation body 50 is a solid object. In an alternative embodiment, the flotation body 50 is a hollow object, such as a sealed compartment filled with air or a material to provide buoyancy, for example.

The flotation body 50 may have any configuration or be made of any suitable material to achieve the first function of the flotation body 50, which is to provide buoyancy to the PWC 10 if the hull 14 is breached. For example, and referring to FIGS. 3A and 3B, the flotation body 50 is made in whole or in part from a material that is impermeable to water. This material being impermeable to water may prevent water from passing through the flotation body 50. Alternatively, if water is permitted to pass through the flotation body 50, the impermeable material of the flotation body 50 may prevent water from being absorbed by the impermeable material. One possible and non-limiting example of such an impermeable material for the flotation body 50 is a foam, such that the flotation body 50 is a foam (sometimes referred to herein as a "foam flotation body 50"). The foam, through its material composition and properties (e.g. size, arrangement, density, thickness, repellency, etc.), may confer the desired buoyancy to the flotation body 50. Some possible and non-limiting example of materials for the foam include polypropylene and polyurethane. Another possible and non-limiting example of a material for the foam include expanded polypropylene (EPP). The properties of the foam of the flotation body 50 may be selected to meet regulatory or certification standards established for watercraft in the event of a breach in a hull. The foam of the flotation body 50 may be impermeable to bilge cleaner and oil. The foam of the flotation body 50 may be molded to the desired shape, or machined to the desired shape. The flotation body 50 may include, or be composed of, other buoyant materials which achieve the first function of the flotation body 50 of providing buoyancy to the PWC 10 if the hull 14 is breached. Referring to FIGS. 3A and 3B, the flotation body 50 is a unitary body. Referring to FIGS. 3A and 3B, the flotation body 50 is a monolithic or one-piece body that helps to provide distributed flotation, as explained in greater detail below. In an alternative embodiment, an example of which is provided below, the flotation body 50 is composed of multiple pieces. In some embodiments, the flotation body 50 includes a sealed compartment that may house air, gas, foam or another material to provide buoyancy. The sealed compartment may be a hollow shell made out of plastics or composites, for example.

Referring to FIGS. 3A and 3B, the flotation body 50 is positioned with respect to the battery pack 40. Referring to FIGS. 3A and 3B, the flotation body 50 cooperates with the battery pack 40 within the interior volume 37. This positioning and cooperation may take different forms. For example, and referring to FIGS. 3A and 3B, the flotation body 50 is positioned within the interior volume 37 between the battery pack 40 and the bottom wall 14B of the hull 14. The flotation body 50 is disposed vertically between the battery pack 40 and the bottom wall 14B. The flotation body 50 is sandwiched vertically between the battery pack 40 and the bottom wall 14B. The flotation body 50 spaces the battery pack 40 vertically apart from the bottom wall 14B.

The flotation body 50 may be disposed between the battery pack 40 and other portions of the hull 14. For example, and referring to FIG. 3B, the flotation body 50 is positioned between the battery pack 40 and the side wall 14S of the hull 14. Referring to FIG. 3B, some of the flotation body 50 is disposed laterally or horizontally between the battery pack 40 and the side wall 14S. Referring to FIG. 3B, some of the flotation body 50 is sandwiched laterally or horizontally between the battery pack 40 and the side wall 14S. Referring to FIG. 3B, some of the flotation body 50 spaces the battery pack 40 laterally or horizontally apart from the side wall 14S. The flotation body 50 is thus positioned in the interior volume 37 between the battery pack 40 and one or more interior surfaces (i.e. bottom surfaces and/or side wall surfaces) of the hull 14. When positioned between the side wall 14S and one or more sides of the battery pack enclosure 42, the flotation body 50 covers some or all of the sides of the battery pack 40 which may provide more stability to the battery pack 40 when the PWC 10 pulls side accelerations or "Gs", and may help provide some lateral stability to the battery pack 40. When positioned between the side wall 14S and one or more sides of the battery pack enclosure 42, the flotation body 50 at least partially encloses the battery pack 40.

In an embodiment, an example of which is shown in FIG. 3B, the flotation body 50 is disposed in the interior volume 37 between the battery pack 40, and both of the bottom wall 14B and the side wall 14S of the hull 14. In an alternative embodiment, the flotation body 50 is disposed in the interior volume 37 between the battery pack 40 and only the bottom wall 14B. In an alternative embodiment, the flotation body 50 is disposed in the interior volume 37 between the battery pack 40 and only the side wall 14S.

The positioning of the flotation body 50 relative to the battery pack 40 within the hull 14 may contribute to the flotation body 50 helping the PWC 10 to achieve a more desirable orientation, or "attitude", if the hull 14 is breached. For example, and referring to FIGS. 3A and 3B, one or both of the flotation body 50 and the battery pack 40 may be positioned closer to the stern 31B of the PWC 10 than to the bow 31A. By positioning the flotation body 50 between the battery pack 40 and the hull 14 and more astern, the buoyancy provided by the flotation body 50 is distributed towards the stern 31B of the PWC 10. In some embodiments, the center of mass of the PWC 10 is also distributed towards the stern 31B due to the location of the battery pack 40 and electric motor 16 (both of which are relatively heavy components) being located towards the stern 31B. As a result, the buoyancy provided by the flotation body 50 may be proximate to the center of mass of the PWC 10. For example, the center of buoyancy of the flotation body 50 and the center of mass of the PWC 10 may be located a substantially similar distance from the stern 31B along the longitudinal center axis 33. By locating the flotation body 50 and its buoyancy more astern or rearward in the hull 14, and optionally proximate to the center of mass of the PWC 10, the flotation body 50 may prevent the bow 31A of the PWC 10 from being oriented straight up (sometimes referred to as "nose up") if water fills the hull 14 during a breach. As a result, the orientation of the PWC 10 in a sinking event will be more horizontal compared to if the buoyancy in the hull 14 were located closer to the bow 31A. Locating the flotation body 50 more astern or rearward in the hull 14 may thus provide the PWC 10 with a less upright orientation and a more horizontal orientation if the hull 14 floods. This more desirable orientation or attitude of the PWC 10 may facilitate towing the partially-sunken PWC 10 by another watercraft, and may also allow the user to maintain access to useful components of the PWC 10 (e.g., the straddle seat 13, the steering mechanism 19, a storage compartment under the hatch, the foot rests of the deck 12, the dashboard/screen, etc.) because these components may remain out of the water in the more desirable attitude. Furthermore, by locating the flotation body 50 and its buoyancy closer to the lowest point in the PWC 10 (e.g. such as near the bottom wall 14B), it may be possible to provide buoyancy earlier during a sinking event such that the PWC 10 may float higher compared to if the flotation body 50 was on the top of the battery pack enclosure 42, for example Referring to FIGS. 3A and 3B, the flotation body 50 has a centroid 52 that is located closer to the stern 31B than to the bow 31A, as measured along the X-axis. The centroid 52 is a point of the flotation body 50 from which the weight of the flotation body 50 may be considered to act. In an embodiment, the centroid 52 is the center of mass of the flotation body 50. In an embodiment, the centroid 52 is the geometric center point of the flotation body 50. In an embodiment, the centroid 52 is the center of buoyancy or the center of gravity of the flotation body 50. Thus, the center of the foam flotation body 50 is closer to the stern 31B than to the bow 31A. In one possible and non-limiting configuration, the centroid 52 is at a position corresponding to 0%-75%, 15%-60%, or 35%-45% of a length L of the hull 14, and thus a length of the PWC 10. The length L is defined between the bow 31A and the stern 31B along the X-axis, and the 0% position is at the stern 31B. Referring to FIG. 3A, the side wall 14S includes a stern side wall portion 14SB located at the stern 31B, and a bow side wall portion 14SA located at the bow 31A of the PWC 10. The centroid 52 is located closer to the stern side wall portion 14SB than it is to the bow side wall portion 14SA.

Another possible configuration for locating the flotation body 50 closer to the stern 31B than to the bow 31A is described with reference to FIG. 3A. The flotation body 50 extends along the X-axis between a bow end 54A of the flotation body 50 and a stern end 54B. The bow end 54A is positioned closer to the bow 31A than the stern end 54B, and the stern end 54B is positioned closer to the stern 31B than the bow end 54A. A bow distance DA or length is defined parallel to the X-axis between the bow 31A and the bow end 54A, and a stern distance DB or length is defined parallel to the X-axis between the stern 31B and the stern end 54B. The bow distance DA is greater than the stern distance DB, which results in the flotation body 50 being positioned closer to the stern 31B than to the bow 31A. In an embodiment, the bow distance DA is between two and five times greater than the stern distance DB. In an embodiment, the bow distance DA is between two and four times greater than the stern distance DB. In an embodiment, the bow distance DA is one or more orders of magnitude greater than the stern distance DB.

In an embodiment, and referring to FIG. 3A, the battery pack 40 has a battery pack length BPL defined along the center axis 33 or the X-axis. The flotation body 50 has a flotation body length FBL defined along the center axis 33 or the X-axis. One or both of the battery pack length BPL and the flotation body length FBL have a value that is at least 25% of the length L of the hull 14. In an embodiment, the assembly of the flotation body 50 and the battery pack 40 extend along at least 25% of the length L of the hull 14. In an embodiment, one or both of the battery pack length BPL and the flotation body length FBL have a value that is between 25% and 100% of the length L of the hull 14. In an embodiment, the flotation body 50 (and possibly also the battery pack 40) extends the full length L of the hull 14. In an embodiment, the flotation body 50 has substantially the same length as the battery pack 40. In an embodiment, the flotation body 50 extends at least the full battery pack length BPL of the battery pack 40, and at least the full width of the battery pack 40 where the width is defined parallel to the Z-axis.

Referring to FIGS. 3A and 3B, the flotation body 50 positioned between the battery pack 40 and the hull 14 may provide a second function of the flotation body 50, which is to help dampen vibrations that the battery pack 40 may experience and that emanate from the hull 14. The battery pack 40 within the hull 14 may experience vibrations due to wave impacts against the hull 14 and/or due to the acceleration or deceleration of the PWC 10. The flotation body 50 may help to attenuate, reduce or eliminate vibrations experienced by the battery pack 40. The flotation body 50 may achieve this second function based on one or more properties of the flotation body. For example, in the embodiment where the flotation body 50 is composed of a foam material, the foam material may have at least one property (e.g. density, thickness, size, extent, etc.) to dampen vibrations from the hull 14 before they are experienced by the battery pack 40. In another example, the flotation body 50 may be positioned with respect to the hull 14 and to the battery pack 40 to dampen the vibrations from the hull 14. Thus, positioning the flotation body 50 between the battery pack 40 and the hull 14 helps to isolate the battery pack 40 from vibrations emanating from the hull 14. Positioning the flotation body 50 between the battery pack 40 and the hull 14 helps to physically separate the battery pack 40 from vibrations emanating from the bottom wall 14B and/or the side wall 14S of the hull 14. Positioning the flotation body 50 between the battery pack 40 and the hull 14 may help to reduce resonant vibrations, which may be important for minimizing the risk of damage to the PWC 10. In some embodiments, the foam material may have at least one property that is configured to dampen resonant frequencies of the hull 14 and/or of the battery pack 40.

Referring to FIG. 3A, the battery pack enclosure 42 of the battery pack 40 includes mounts 44. The mounts 44 are any suitable bracket, arm, or other mechanical object that allows for the battery pack enclosure 42, and thus the battery pack 40, to be fixedly attached to mounting pads 14P of the hull 14. When the mounts 44 are secured to the mounting pads 14P, the load of the relatively heavy (e.g. over 100 kg) battery pack 40 may be distributed over a portion of the hull 14. Vibration dampeners may be included in the connections between the battery pack 40 and the hull 14 to dampen vibrations from the hull 14. When achieving the second function of dampening vibrations directed toward the battery pack 40, the flotation body 50 may reduce the need for additional vibration dampening, and thus help to reduce or eliminate the number, size or strength of vibration dampeners that may be placed at the interface between the mounts 44 and the mounting pads 14P. Using fewer, none or lighter vibration dampeners helps to reduce the weight of the PWC 10, reduce the complexity of mounting of the battery pack 40, and reduce the cost of manufacturing the PWC 10. In an embodiment, the PWC 10 is free of vibration dampeners engaged with the battery pack 40. Furthermore, it may be possible to achieve improved vibration dampening for the battery pack 40 by providing vibration dampening across one or more surfaces of the battery pack 40 using the flotation body 50, in comparison to the vibration dampening provided by the vibration dampeners at the discrete points defined by the mounting pads 14P and mounts 44.

The mounts 44 may provide support for the battery pack 40 in the vertical and/or lateral directions, for example. In some embodiments, as discussed elsewhere herein, the flotation body 50 may also provide support for the battery pack 40 in the vertical and/or lateral directions. The number and/or strength of the mounts 44 may be reduced based on the additional support provided by the flotation body 50.

The vibration dampening provided by the flotation body 50 may be adjusted or set as desired. For example, in the embodiment where the flotation body 50 is composed of a foam material, the stiffness or density of the foam material may be selected to provide dampening of specific undesirable resonant frequencies or range of frequencies, that may be experienced by the battery pack 40 during operation of the PWC 10. In another possible example, the vibration dampening properties of the foam flotation body 50 may vary throughout the foam flotation body 50. In one possible configuration of this example, the vibration dampening properties provided by the flotation body 50 may be a result of using a more resilient foam material in the portions of the flotation body 50 adjacent or abutting the battery pack 40, and using a harder more structural foam material in the remainder of the flotation body 50 to support the load of the battery pack 40. The vibration dampening provided by the flotation body 50 may also be adjusted or set by tuning or selecting a particular shape and/or composition of the foam material for improved vibration dampening.

Figure 4A:
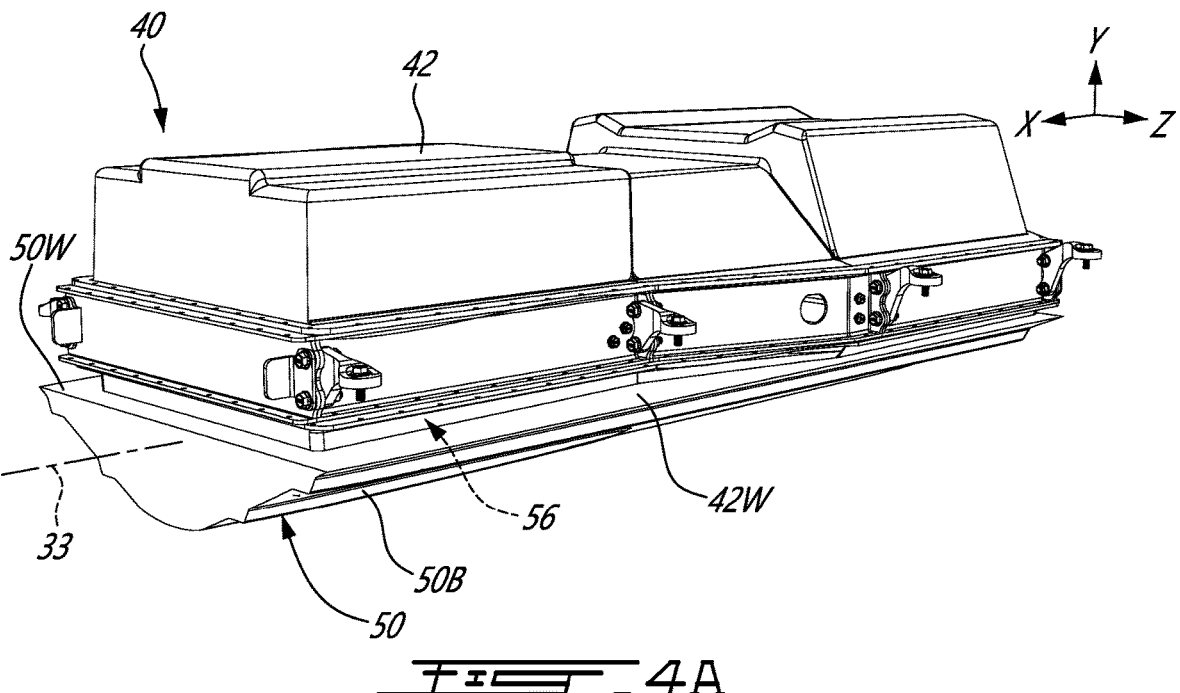
FIG. 4A is a perspective view of the battery pack and a flotation body.
Figure 4B:
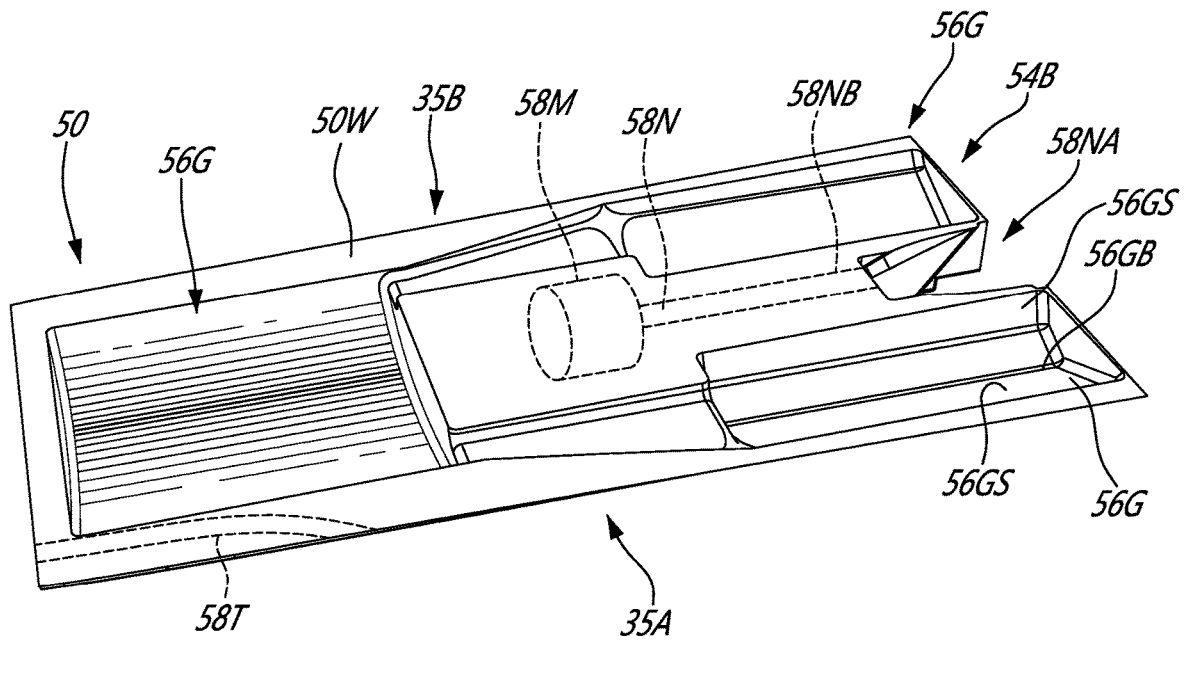
FIG. 4B is a perspective view of the flotation body of FIG. 4A.

Referring to FIGS. 3B, 4A and 4B, the flotation body 50 positioned between the battery pack 40 and the hull 14 may provide a third function of the flotation body 50, which is to help facilitate the positioning and assembly of the compo-nents within the hull 14 of the PWC 10. More particularly, the third function of the flotation body 50 may include facilitating the positioning of the battery pack 40 within the hull 14. The flotation body 50 and the battery pack 40 have complementary features 56. The complementary features 56 are contours, reliefs, protrusions or other objects, on one or both of the battery pack 40 and the flotation body 50, which help to position the battery pack 40 within the hull 14. The complementary features 56 may take any form or be any object which achieves this functionality. For example, and referring to FIGS. 3B, 4A and 4B, the complementary features 56 include one or more groove(s) 56G which extend into the flotation body 50. In the configuration of the flotation body 50 shown in FIG. 4B, the flotation body 50 has an upper wall 50W which defines an uppermost surface of the flotation body 50. The groove(s) 56G extend into the corpus of the flotation body 50 from the upper wall 50W in a direction toward the bottom wall 14B of the hull 14. Each groove 56G has bottom groove wall 56GB that is positioned beneath a plane defined by the upper wall 50W, and also has upright side groove walls 56GS that extend between bottom groove wall 56GB and the upper wall 50W. The upper wall 50W abuts against a lower wall 42W of the battery pack enclosure 42 of the battery pack 40. Referring to FIG. 3B, the complementary features 56 include one or more portion(s) 56P of an exterior of the battery pack 40 that are received in the groove(s) 56G. The portion(s) 56P of the battery pack 40 are segments of the battery pack enclosure 42 which protrude outwardly from a remainder of the battery pack enclosure 42 in a direction toward the bottom wall 14B. The portion(s) 56P and the groove(s) 56G have complementary shapes so that they can mate with each other. Thus, in embodiments where the flotation body 50 is composed of a foam material, the foam flotation body 50 has cavities or groove(s) 56G that match or otherwise complement an exterior portion(s) 56P of the battery pack 40. The complementary features 56 of the flotation body 50 and the battery pack 40 allow the battery pack 40 to be properly positioned within the hull 14 by, for example, placing the portion(s) 56P of the battery pack enclosure 42 into the groove(s) 56G. In this way, the battery pack 40 may be assembled and installed within the hull without any need for laborious manual alignment. The groove(s) 56G in the flotation body 50 may thus help to consistently position the battery pack 40.

The arrangement of groove(s) 56G and portion(s) 56P may take any suitable form. For example, and referring to FIGS. 4A and 4B, the upper wall 50W of the flotation body 50 has multiple grooves 56G. The grooves 56G are disposed symmetrically about a vertical plane which contains the center axis 33. There are three grooves 56G, with two of the grooves 56G disposed further aft than the other groove 56G. The aft grooves 56G are spaced further apart from each other along the Z-axis and thus closer to the port and starboard sides 35A,35B than the groove 56G which is forward of the aft grooves 56G. Similarly, the battery pack enclosure 42 has three portions 56P that are positioned and shaped similarly to the three grooves 56G. Other arrangements of groove(s) 56G and portion(s) 56P are possible. For example, in another possible configuration of the complementary features 56, the groove(s) 56G are present in the battery pack enclosure 42 and the portion(s) 56P are present in the flotation body 50. In yet another possible configuration of the complementary features 56, the flotation body 50 might not include the upright side groove walls 56GS. Instead, the bottom groove walls 56GB may terminate at the upper wall 50W.

In addition to assisting with the positioning of the battery pack 40, the third function of the flotation body 50 between the battery pack 40 and the hull 14 may also facilitate positioning and assembly other components of the PWC 10 within the hull 14. For example, and referring to FIG. 4B, the flotation body 50 includes one or more tubing passage(s) 58T. The tubing passage(s) 58T are channels formed along a surface of the flotation body 50, or through-holes extending through the flotation body 50, which receive tubing, wiring or other similar elongated bodies that are present in the interior volume 37 of the hull 14. Thus, the flotation body 50 may facilitate assembling, positioning and/or routing tubing and wiring in the hull 14 without having to perform careful and laborious manual alignment, by running them through or along the flotation body 50. Alternatively or additionally, the portions of the flotation body 50 delimiting the tubing passage(s) 58T may support the tubing and wiring in the hull 14, and/or may dampen vibrations which might be experienced by the tubing and wiring in the hull 14. Such tubing may include coolant tubing, and such wiring may include electrical wires. The tubing passage(s) 58T may serve as placeholders for tubing along the side wall 14S of the hull 14. In some embodiments, the tubing passage(s) 58T include hoses that are molded directly into the flotation body 50 during fabrication. In other embodiments, the tubing passage(s) 58T are channels (e.g., cylindrical cut-outs) formed within the volume of the flotation body 50 that are configured to carry a fluid. The walls of the channels may be coated with a waterproof coating to form a channel capable of carrying a coolant. Connectors may be implemented at either end of the tubing passage(s) 58T for coupling to other components of the thermal management system.

Another component of the PWC 10 within the hull 14 whose positioning may be facilitated by the flotation body 50 is the electric motor 16. Referring to FIG. 4B, the upper wall 50W of the flotation body 50 has a motor groove 58M extending inwardly from the upper wall 50W. The motor groove 58M is shaped and sized to receive the electric motor 16 in the motor groove 58M, such that the electric motor 16 abuts against, and is supported by, the flotation body 50. Referring to FIG. 4B, the flotation body 50 has a notch 58NA or cut-out that may be configured (e.g., sized and shaped) for receiving and supporting the drive shaft 28. The notch 58NA may also or instead be configured to receive the outer walls of the water intake 17 formed in the bottom wall 14B of the hull 14. The notch 58NA may be formed in the stern end 54B of the flotation body 50 to accommodate the water intake 17 and/or the driveshaft 28. In some embodiments, the flotation body 50 has a driveshaft groove 58NB extending between the motor groove 58M and the notch 58NA through which the drive shaft 28 extends. Other components of the PWC 10 that are located in the hull 14 may also be positioned by/through, or supported by, the flotation body 50.

The flotation body 50 positioned between the battery pack 40 and the hull 14 may provide a fourth function of the flotation body 50, which is to help secure and stabilize the battery pack 40 within the hull 14 of the PWC 10. This may be achieved in different ways. For example, and referring to FIGS. 3A and 3B, the complementary features 56 may provide at least some lateral support for the battery pack 40. The complementary features 56 may help to reduce or prevent movement of the battery pack 40 relative to the hull 14 in a direction parallel to the Z-axis. The complementary features 56 may help to reduce or prevent movement of the battery pack 40 and of the flotation body 50 relative to the hull 14 in a direction parallel to the Z-axis. One possible technique for achieving this lateral support and stability is by positing the portion(s) 56P of the battery pack enclosure 42 into the groove(s) 56G of the flotation body 50. In such a configuration, the groove(s) 56G and portion(s) 56P form interlocking features at the interface between the upper wall 50W and the lower wall 42W which inhibit relative movement between the battery pack 40 and the flotation body 50 in directions parallel to both the X and Z axes. For example, the upright side groove walls 56GS may laterally support the battery pack 40 when the PWC 10 is turning sharply. Other cooperating and interlocking features are possible. Other possible interlocking features include, but are not limited to, latches, hook-and-loop fasteners, clips, contact adhesives, and male-female members.

The flotation body 50 may help to secure and stabilize the battery pack 40 within the hull 14 of the PWC 10 by interfacing with the bottom wall 14B of the hull 14. Referring to FIG. 3B, the flotation body 50 includes a lower wall 50B. The lower wall 50B abuts against the bottom wall 14B of the hull 14. The lower wall 50B has a shape that partially or fully conforms to a shape of the bottom wall 14B. Furthermore, the lower wall 50B of the flotation body may be sandwiched between vertically inclined portions of the bottom wall 14B, which may provide lateral stability to the flotation body 50 and thus to the battery pack 40 resting on the flotation body 50, by helping to reduce or prevent movement of the flotation body 50 relative to the bottom wall 14B in a direction parallel to the Z-axis. Referring to FIG. 4A, the lower wall 50B may also have grooves, cut-outs, indents and/or protrusions which mate with corresponding grooves or protrusions of the bottom wall 14B so as to provide additional lateral stability to the flotation body 50.

The gravitational force generated by the mass of the battery pack 40 may act on the flotation body 50 and provide additional lateral and/or longitudinal (i.e. relative to the X-axis) stability. In an embodiment, the battery pack 40 rests on, and is supported by, the flotation body 50. In such a configuration, and assuming the mass of the battery pack 40 is about 150 kg, the gravitational force applied to the flotation body 50 by the battery pack 40 alone would be approximately 1,470 N. The battery pack 40 thus applies a gravitational load to the flotation body 50, thereby increasing the frictional contact between the lower wall 50B of the flotation body 50 and the bottom wall 14B of the hull 14. The increased frictional contact between the flotation body 50 and the inner surface of the hull 14 may help secure and stabilize the battery pack 40 within the hull 14 of the PWC 10 by reducing or preventing relative movement between the flotation body 50 and the hull 14. The gravitational force applied to the flotation body 50 may be complemented by an additional force resulting from the deck 12 being sealed to the hull 14 and exerting an inward clamping force on the battery pack 40 and/or flotation body 50. The gravitational force applied to the flotation body 50 may be complemented by yet another force resulting from securing the mounts 44 of the battery pack 40 to the mounting pads 14P of the hull 14, which may exert an inward clamping force on the flotation body 50. These additional forces may further help to secure and stabilize the battery pack 40 within the hull 14 of the PWC 10 by reducing or preventing relative movement between the flotation body 50 and the hull 14. If desired, the lower wall 50B of the flotation body 50 may be fastened or adhered to the bottom wall 14B of the hull 14, although this may not be necessary to ensure the stability of the battery pack 40 because of the other forces described above.

The flotation body 50 may have other configurations in addition to the one shown in FIGS. 3A to 4B. For example, and referring to FIGS. 5A and 5B, the flotation body 50 is composed of separate and distributed portions or pieces, as described above. The flotation body 50 includes a bow portion 51B located in the interior volume 37 at the bow 31A of the PWC 10, and a stern portion 51S located in the interior volume 37 at the stern 31B. The interior volume 37 of the hull 14 is free of the flotation body 50 between the bow and stern portions 51B,51S. In this configuration, the battery pack 40 is mounted directly to the mounting pads 14P of the hull 14, and the bow and stern portions 51B,51S are positioned in front of and behind, respectively, the battery pack enclosure 42. In this way, the bow and stern portions 51B,51S are positioned between the battery pack 40 and the side wall 14S of the hull 14. The bow portion 51B of the flotation body 50 is positioned between the battery pack 40 and the bow side wall portion 14SA of the hull 14. The stern portion 51S of the flotation body 50 is positioned between the battery pack 40 and the stern side wall portion 14SB of the hull 14. In some embodiments, the bow and/or stern portions 51B,51S may abut the battery pack 40 to dampen vibrations and/or to stabilize the battery 40 (e.g., by providing lateral support). The bow and stern portions 51B,51S may also or instead aid in the positioning and assembly of the battery pack 40. In some embodiments, one or more of the bow and stern portions 51B,51S may be implemented in conjunction or in combination with the flotation body 50 of FIGS. 3A, 3B, 4A and 4B.

Figure 5A:
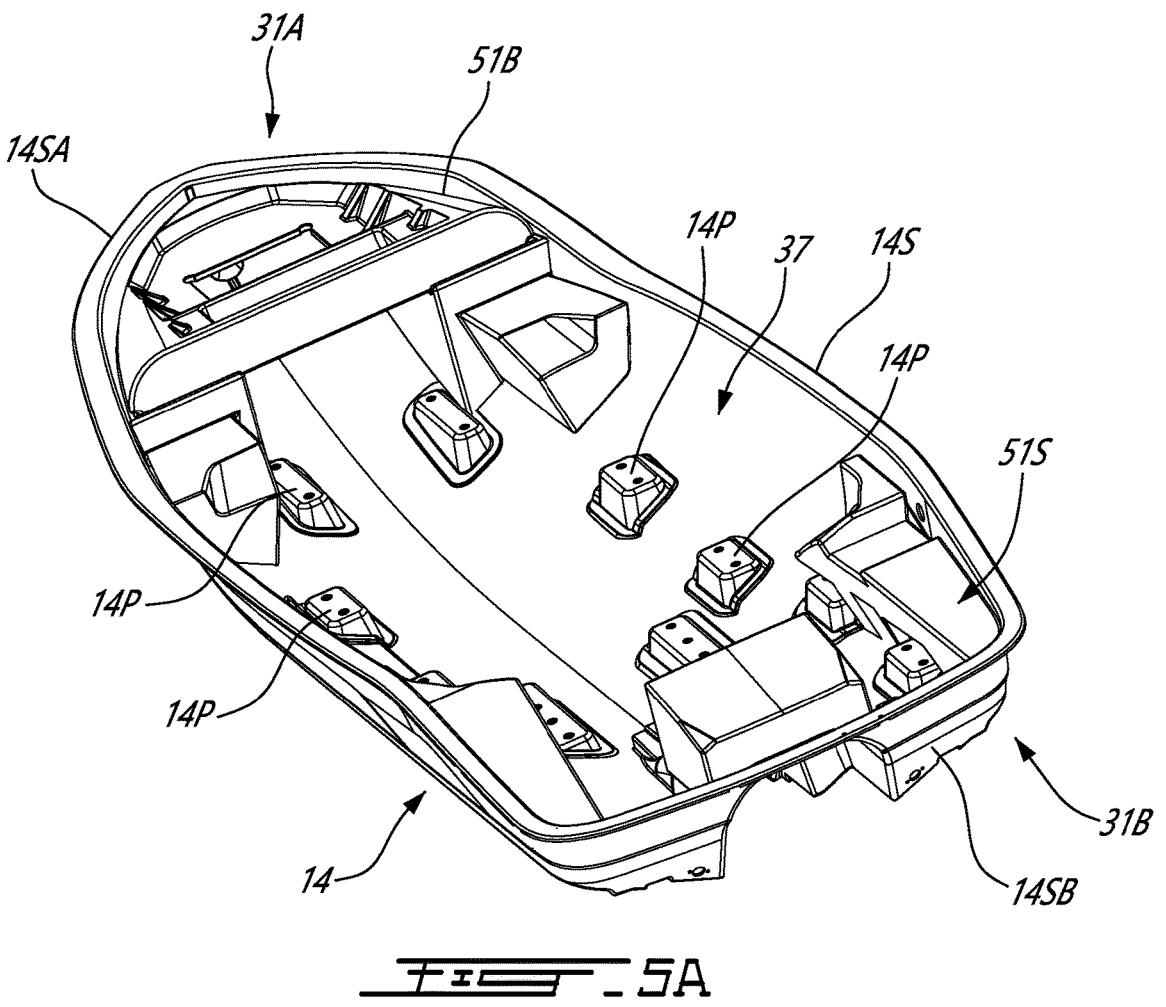
FIG. 5A is a top perspective view of a hull of the watercraft of FIG. 1.
Figure 5B:
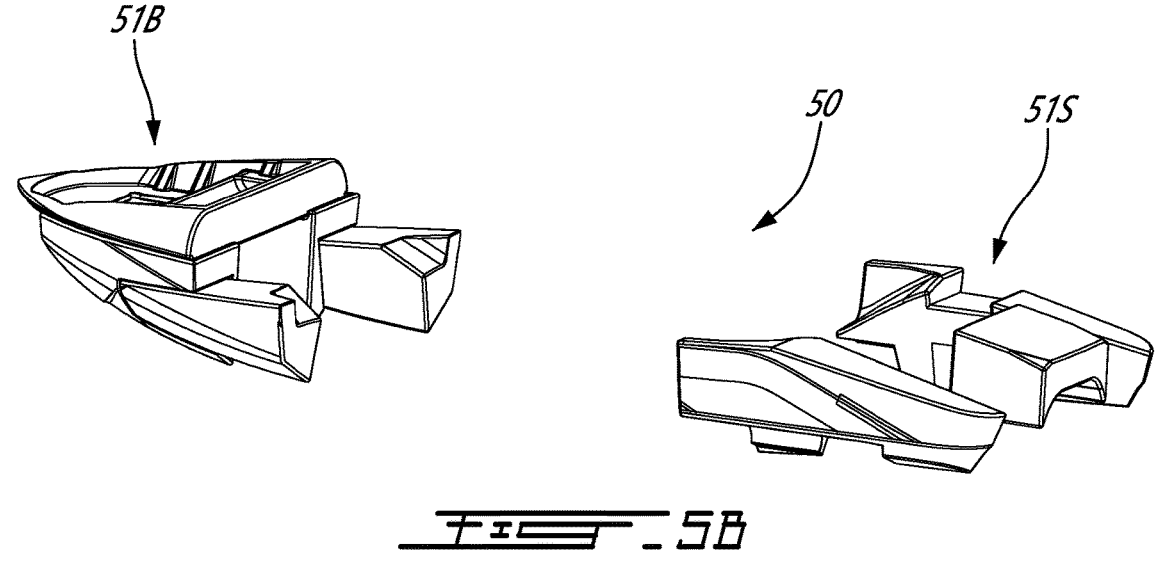
FIG. 5B is an exploded view of the flotation body of the hull of FIG. 5A.

Referring to FIGS. 5A and 5B, the bow and stern portions 51B,51S are both composed of a foam material. The flotation body 50 of FIGS. 5A and 5B has distributed foam portions 51B,51S. Referring to FIGS. 5A and 5B, the bow portion 51B includes five foam pieces which are connected or engaged together, and the stern portion 51S includes three foam pieces which are connected or engaged together. However, one or more of the bow and stern portions 51B,51S may also or instead include a sealed compartment to provide buoyancy. The pieces of the stern portion 51S are fully aft of the battery pack 40. The pieces of the bow portion 51B are fully forward of the battery pack 40. One or both of the bow and stern portions 51B,51S may be positioned underneath the foot rests of the PWC 10. The foam pieces of the bow and stern portions 51B,51S may be sandwiched between the hull 14 and the deck 12 when the hull 14 and deck 12 are assembled together, which may help to keep the foam pieces stable and in position.

The flotation body 50 disclosed herein may be used to perform multiple functions, in addition to its primary function of helping the PWC 10 to remain afloat if the hull 14 is breached. Rather than being an object used only for flotation, the flotation body 50 disclosed herein is given other useful purposes that allow for expanding the use of the flotation body 50 in the design of the PWC 10. By incorporating the flotation body 50 into the design of the PWC 10, the PWC 10 may be designed to minimize weight and efficiently use the interior volume 37. For example, by using the foam flotation body 50 as a structural support for the battery pack 40, it may be possible to reduce or remove some of the battery pack 40 mounting points in the hull 14, and also reduce or remove other stabilizers and dampeners, and thus remove some of the weight of the PWC 10. Furthermore, by using the foam flotation body 50 as per its fourth function to stabilize the battery pack 14, there may be less of a need for separate connections between the battery pack 40 and the hull 14 to secure the battery pack 40 to the hull 14. Reducing the number of connections can reduce weight, cost and manufacturing time.

Referring to FIG. 6, there is disclosed a method 100 of assembling the PWC 10. At 102, the method 100 includes placing the flotation body 50 against a bottom of the hull 14. This may be achieved by positioning the lower wall 50B of the flotation body 50 against bottom wall 14B of the hull 14. The lower wall 50B of the flotation body 50 may be slid along bottom wall 14B to properly position the flotation body 50 within the hull 14. At 104, the method 100 includes placing the battery pack 40 on top of the flotation body 50. Before being secured to the hull 14, the battery pack 40 and the flotation body 50 may be collectively displaced within the hull 14 by sliding the flotation body 50 against the bottom of the hull 14. The displaceability of the flotation body 50 and the battery pack 40 helps to achieve the desired position for the battery pack 40 in the hull 14 prior to the battery pack 40 being secured to the hull 14. At 104, the method 100 may also include aligning an exterior of the battery pack 40 (such as part of the battery pack enclosure 42) and the flotation body 50 with the complementary features 56. Aligning the exterior of the battery pack 40 may include aligning the exterior of the battery pack 40 with groove(s) 56G extending into the flotation body 50. At 104, the method 100 may then include securing the battery pack 40 to the hull 14 via the mounting pads 14P. At 106, the method 100 includes sealing the hull 14, such as by assembling it with the deck 12.

Referring to FIG. 7, there is disclosed a method 200 of repairing or modifying the PWC 10. The method 200 may include a retrofit of an existing PWC 10. The method 200 may includes features or steps of the method 100 of assembling the PWC 10. At 202, the method 200 includes removing components from within a hull 14 of the PWC 10, such as the components associated with or including an internal combustion engine. At 204, the method 200 includes placing the flotation body 50 against the bottom of the hull 14. At 206, the method 200 includes placing the battery pack 40 on top of the flotation body 50 within the hull 14.

In an embodiment, the PWC 10 is free of components heated by an internal-combustion engine, such that the foam flotation body 50 may be positioned anywhere within the hull 14 without risk of the foam flotation body 50 igniting.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the flotation body 50 is described as providing a number of functions, and it will be appreciated that the flotation body 50 may provide only one of these functions, more than one of these functions in any combination, or all of these functions collectively. Yet further modifications could be implemented by a person of ordinary skill in the art in view of the present disclosure, which modifications would be within the scope of the present technology.

Example embodiments of the present disclosure will now be provided.

Example embodiment 1. A personal watercraft, comprising: a hull having a bottom wall and a side wall extending upwardly from the bottom wall, the bottom and side walls defining an interior volume of the hull; a battery pack including a plurality of battery modules, the battery pack positioned within the interior volume; and a flotation body positioned within the interior volume between the battery pack and at least one of the bottom wall of the hull and the side wall of the hull.

Example embodiment 2. The personal watercraft of example embodiment 1, comprising a bow and a stern, the flotation body having a centroid located closer to the stern than to the bow.

Example embodiment 3. The personal watercraft of example embodiment 1, wherein the side wall includes a stern side wall portion at a stern of the personal watercraft, the side wall includes a bow side wall portion at a bow of the personal watercraft, the flotation body having a centroid located closer to the stern side wall portion than to the bow side wall portion.

Example embodiment 4. The personal watercraft of example embodiment 3, wherein the flotation body extends between a bow end of the flotation body and a stern end of the flotation body, a bow distance defined between the bow and the bow end, and a stern distance defined between the stern and the stern end, the bow distance being greater than the stern distance.

Example embodiment 5. The personal watercraft of any one of example embodiments 1 to 4, wherein the flotation body includes a foam material, the foam material having at least one property to dampen vibrations from the hull.

Example embodiment 6. The personal watercraft of example embodiment 5, wherein the foam material at least partially isolates the battery pack from the vibrations from the hull.

Example embodiment 7. The personal watercraft of any one of example embodiments 1 to 6, wherein the flotation body and the battery pack include complementary features to position the battery pack within the hull.

Example embodiment 8. The personal watercraft of example embodiment 7, wherein the complementary features provide at least some lateral support for the battery pack.

Example embodiment 9. The personal watercraft of example embodiment 7 or 8, wherein the complementary features include at least one groove extending into the flotation body and at least a portion of an exterior of the battery pack received in the at least one groove.

Example embodiment 10. The personal watercraft of any one of example embodiments 7 to 9, wherein the flotation body includes an upper wall, and the battery pack includes a battery enclosure housing the plurality of battery modules, the battery enclosure having a lower wall abutted against the upper wall of the flotation body.

Example embodiment 11. The personal watercraft of example embodiment 10, wherein the complementary features include interlocking features at an interface between the upper and lower walls.

Example embodiment 12. The personal watercraft of example embodiment 11, wherein the interlocking features include at least one groove extending into the upper wall of the flotation body and at least part of the lower wall of the battery enclosure received in the at least one groove.

Example embodiment 13. The personal watercraft of any one of example embodiments 1 to 12, wherein the flotation body includes at least one groove and the personal watercraft has tubing received in the at least one groove.

Example embodiment 14. The personal watercraft of any one of example embodiments 1 to 13, wherein the flotation body includes a lower wall having a shape at least partially conforming to a shape of the bottom wall of the hull.

Example embodiment 15. The personal watercraft of any one of example embodiments 1 to 14, wherein the flotation body includes an upper wall, and the personal watercraft includes an electric motor powered by the battery pack, the electric motor abutting the upper wall of the flotation body.

Example embodiment 16. The personal watercraft of example embodiment 15, wherein the upper wall has at least one groove, the electric motor received in the at least one groove.

Example embodiment 17. The personal watercraft of example embodiment 15 or 16, wherein the flotation body includes a notch to receive a drive shaft of the electric motor and/or to receive a water intake formed in the bottom wall of the hull.

Example embodiment 18. The personal watercraft of any one of example embodiments 1 to 17, comprising a bow and a stern and a center axis that extends between the bow and the stern, a length of the hull defined between the bow and the stern, the battery pack having a battery pack length defined along the center axis, the flotation body having a flotation body length defined along the center axis, at least one of the battery pack length and the flotation body length being between 25% and 100% of the length of the hull.

Example embodiment 19. The personal watercraft of any one of example embodiments 1 to 18, wherein the flotation body is positioned within the interior volume between the battery pack and a portion of the side wall of the hull.

Example embodiment 20. The personal watercraft of any one of example embodiments 1 to 19, wherein the battery pack rests on the flotation body and applies a load to the flotation body.

Example embodiment 21. The personal watercraft of any one of example embodiments 1 to 20, comprising an electric motor and an impeller configured to be driven by the electric motor to displace the personal watercraft, the battery pack configured to provide an electric current to the electric motor to drive the impeller, the electric current being the only energy provided to the electric motor.

Example embodiment 22. The personal watercraft of any one of example embodiments 1 to 21, wherein the flotation body is a unitary body.

Example embodiment 23. The personal watercraft of any one of example embodiments 1 to 22, wherein the flotation body includes at least one of polypropylene foam and polyurethane foam.

Example embodiment 24. The personal watercraft of any one of example embodiments 1 to 23, wherein the flotation body includes a sealed compartment.

Example embodiment 25. The personal watercraft of any one of example embodiments 1 to 24, wherein each battery module of the plurality of battery modules includes a plurality of battery cells.

Example embodiment 26. The personal watercraft of any one of example embodiments 1 to 25, comprising a straddle-seat.

Example embodiment 27. A personal watercraft, comprising: a hull having a bottom wall and a side wall extending upwardly from the bottom wall, the bottom and side walls defining an interior volume of the hull; a battery pack positioned within the interior volume; an electric motor powered by the battery pack; an impeller configured to be driven by the electric motor to displace the personal watercraft; and a flotation body positioned within the interior volume between the battery pack and at least one of the bottom wall and the side wall of the hull.

Example embodiment 28. A personal watercraft, comprising: a hull extending between a bow of the personal watercraft and a stern of the personal watercraft, the hull having defining an interior volume; a battery pack including a plurality of battery modules, the battery pack positioned within the interior volume; and a flotation body positioned within the interior volume vertically between the battery pack and the hull, the flotation body having a centroid located closer to the stern than to the bow.

Example embodiment 29. The personal watercraft of example embodiment 28, wherein the hull includes a side wall being substantially upright, the side wall having a stern side wall portion at the stern, the side wall having a bow side wall portion at the bow, the centroid of the flotation body located closer to the stern side wall portion than to the bow side wall portion.

Example embodiment 30. The personal watercraft of example embodiment 28 or 29, wherein the flotation body extends between a bow end of the flotation body and a stern end of the flotation body, a bow distance defined between the bow and the bow end, and a stern distance defined between the stern and the stern end, the bow distance being greater than the stern distance.

Example embodiment 31. The personal watercraft of any one of example embodiments 28 to 30, wherein the flotation body includes a foam material, the foam material having at least one property to dampen vibrations from the hull.

Example embodiment 32. The personal watercraft of example embodiment 31, wherein the foam material at least partially isolates the battery pack from the vibrations from the hull.

Example embodiment 33. The personal watercraft of any one of example embodiments 28 to 32, wherein the flotation body and the battery pack include complementary features to position the battery pack within the hull.

Example embodiment 34. The personal watercraft of example embodiment 33, wherein the complementary features provide at least some lateral support for the battery pack.

Example embodiment 35. The personal watercraft of example embodiment 33 or 34, wherein the complementary features include at least one groove extending into the flotation body and at least a portion of an exterior of the battery pack received in the at least one groove.

Example embodiment 36. The personal watercraft of any one of example embodiments 33 to 35, wherein the flotation body includes an upper wall, and the battery pack includes a battery enclosure housing the plurality of battery modules, the battery enclosure having a lower wall abutted against the upper wall of the flotation body.

Example embodiment 37. The personal watercraft of example embodiment 36, wherein the complementary features include interlocking features at an interface between the upper and lower walls.

Example embodiment 38. The personal watercraft of example embodiment 37, wherein the interlocking features include at least one groove extending into the upper wall of the flotation body and at least part of the lower wall of the battery enclosure received in the at least one groove.

Example embodiment 39. The personal watercraft of any one of example embodiments 28 to 38, wherein the flotation body includes at least one groove and the personal watercraft has tubing received in the at least one groove.

Example embodiment 40. The personal watercraft of any one of example embodiments 26 to 39, wherein the flotation body includes a lower wall having a shape at least partially conforming to a shape of the hull.

Example embodiment 41. The personal watercraft of any one of example embodiments 28 to 40, wherein the flotation body includes an upper wall, and the personal watercraft includes an electric motor powered by the battery pack, the electric motor abutting the upper wall of the flotation body.

Example embodiment 42. The personal watercraft of example embodiment 41, wherein the upper wall has at least one groove, the electric motor received in the at least one groove.

Example embodiment 43. The personal watercraft of example embodiment 41 or 42, wherein the flotation body includes a notch to receive a drive shaft of the electric motor and/or to receive a water intake formed in a bottom wall of the hull.

Example embodiment 44. The personal watercraft of any one of example embodiments 28 to 43, comprising a bow and a stern and a center axis that extends between the bow and the stern, a length of the hull defined between the bow and the stern, the battery pack having a battery pack length defined along the center axis, the flotation body having a flotation body length defined along the center axis, at least one of the battery pack length and the flotation body length being between 25% and 100% of the length of the hull.

Example embodiment 45. The personal watercraft of any one of example embodiments 28 to 44, wherein the flotation body is positioned within the interior volume between the battery pack and a portion of the side wall of the hull.

Example embodiment 46. The personal watercraft of any one of example embodiments 28 to 45, wherein the battery pack rests on the flotation body and applies a load to the flotation body.

Example embodiment 47. The personal watercraft of any one of example embodiments 28 to 46, comprising an electric motor and an impeller configured to be driven by the electric motor to displace the personal watercraft, the battery pack configured to provide an electric current to the electric motor to drive the impeller, the electric current being the only energy provided to the electric motor.

Example embodiment 48. The personal watercraft of any one of example embodiments 28 to 47, wherein the flotation body is a unitary body.

Example embodiment 49. The personal watercraft of any one of example embodiments 28 to 48, wherein the flotation body includes at least one of polypropylene foam and polyurethane foam.

Example embodiment 50. The personal watercraft of any one of example embodiments 28 to 49, wherein the flotation body includes a sealed compartment.

Example embodiment 51. The personal watercraft of any one of example embodiments 28 to 50, wherein each battery module of the plurality of battery modules includes a plurality of battery cells.

Example embodiment 52. The personal watercraft of any one of example embodiments 28 to 51, comprising a straddle-seat.

Example embodiment 53. A personal watercraft, comprising: a hull defining an interior volume of the personal watercraft; a battery pack including a plurality of battery modules, the battery pack positioned within the interior volume; and a foam flotation body positioned within the interior volume between the battery pack and the hull and abutting the battery pack, the foam flotation body having at least one property to dampen vibrations from the hull.

Example embodiment 54. The personal watercraft of example embodiment 53, comprising a bow and a stern, the foam flotation body having a centroid located closer to the stern than to the bow.

Example embodiment 55. The personal watercraft of example embodiment 53 or 54, wherein the hull includes a side wall, the side wall includes a stern side wall portion at a stern of the personal watercraft, the side wall includes a bow side wall portion at a bow of the personal watercraft, the foam flotation body having a centroid located closer to the stern side wall portion than to the bow side wall portion.

Example embodiment 56. The personal watercraft of any one of example embodiments 53 to 55, wherein the foam flotation body extends between a bow end of the foam flotation body and a stern end of the foam flotation body, a bow distance defined between the bow and the bow end, and a stern distance defined between the stern and the stern end, the bow distance being greater than the stern distance.

Example embodiment 57. The personal watercraft of any one of example embodiments 53 to 56, wherein the foam material at least partially isolates the battery pack from the vibrations from the hull.

Example embodiment 58. The personal watercraft of any one of example embodiments 53 to 57, wherein the foam flotation body and the battery pack include complementary features to position the battery pack within the hull.

Example embodiment 59. The personal watercraft of example embodiment 58, wherein the complementary features provide at least some lateral support for the battery pack.

Example embodiment 60. The personal watercraft of example embodiment 58 or 59, wherein the complementary features include at least one groove extending into the foam flotation body and at least a portion of an exterior of the battery pack received in the at least one groove.

Example embodiment 61. The personal watercraft of any one of example embodiments 58 to 60, wherein the foam flotation body includes an upper wall, and the battery pack includes a battery enclosure housing the plurality of battery modules, the battery enclosure having a lower wall abutted against the upper wall of the foam flotation body.

Example embodiment 62. The personal watercraft of example embodiment 61, wherein the complementary features include interlocking features at an interface between the upper and lower walls.

Example embodiment 63. The personal watercraft of example embodiment 62, wherein the interlocking features include at least one groove extending into the upper wall of the foam flotation body and at least part of the lower wall of the battery enclosure received in the at least one groove.

Example embodiment 64. The personal watercraft of any one of example embodiments 53 to 63, wherein the foam flotation body includes at least one groove and the personal watercraft has tubing received in the at least one groove.

Example embodiment 65. The personal watercraft of any one of example embodiments 53 to 64, wherein the foam flotation body includes a lower wall having a shape at least partially conforming to a shape of the hull.

Example embodiment 66. The personal watercraft of any one of example embodiments 53 to 65, wherein the foam flotation body includes an upper wall, and the personal watercraft includes an electric motor powered by the battery pack, the electric motor abutting the upper wall of the foam flotation body.

Example embodiment 67. The personal watercraft of example embodiment 66, wherein the upper wall has at least one groove, the electric motor received in the at least one groove.

Example embodiment 68. The personal watercraft of example embodiment 66 or 67, wherein the foam flotation body includes a notch to receive a drive shaft of the electric motor and/or to receive a water intake formed in a bottom wall of the hull.

Example embodiment 69. The personal watercraft of any one of example embodiments 53 to 68, comprising a bow and a stern and a center axis that extends between the bow and the stern, a length of the hull defined between the bow and the stern, the battery pack having a battery pack length defined along the center axis, the foam flotation body having a foam flotation body length defined along the center axis, at least one of the battery pack length and the foam flotation body length being between 25% and 100% of the length of the hull.

Example embodiment 70. The personal watercraft of any one of example embodiments 53 to 69, wherein the foam flotation body is positioned within the interior volume between the battery pack and a portion of a side wall of the hull.

Example embodiment 71. The personal watercraft of any one of example embodiments 53 to 70, wherein the battery pack rests on the foam flotation body and applies a load to the foam flotation body.

Example embodiment 72. The personal watercraft of any one of example embodiments 53 to 71, comprising an electric motor and an impeller configured to be driven by the electric motor to displace the personal watercraft, the battery pack configured to provide an electric current to the electric motor to drive the impeller, the electric current being the only energy provided to the electric motor.

Example embodiment 73. The personal watercraft of any one of example embodiments 53 to 72, wherein the foam flotation body is a unitary body.

Example embodiment 74. The personal watercraft of any one of example embodiments 53 to 73, wherein the foam flotation body includes at least one of polypropylene foam and polyurethane foam.

Example embodiment 75. The personal watercraft of any one of example embodiments 53 to 74, comprising a sealed compartment positioned within the interior volume between the battery pack and the hull.

Example embodiment 76. The personal watercraft of any one of example embodiments 53 to 75, wherein each battery module of the plurality of battery modules includes a plurality of battery cells.

Example embodiment 77. The personal watercraft of any one of example embodiments 53 to 76, comprising a straddle-seat.

Example embodiment 78. A personal watercraft, comprising: a hull defining an interior volume of the personal watercraft; a battery pack including a plurality of battery modules, the battery pack positioned within the interior volume; and a flotation body positioned within the interior volume between the battery pack and the hull, the flotation body and the battery pack including complementary features to position the battery pack within the hull.

Example embodiment 79. The personal watercraft of example embodiment 78, wherein the complementary features provide at least some lateral support for the battery pack.

Example embodiment 80. The personal watercraft of example embodiment 78 or 79, wherein the complementary features include at least one groove extending into the flotation body and at least a portion of an exterior of the battery pack received in the at least one groove.

Example embodiment 81. The personal watercraft of any one of example embodiments 78 to 80, wherein the flotation body includes an upper wall, and the battery pack includes a battery enclosure housing the plurality of battery modules, the battery enclosure abutted against the upper wall of the flotation body.

Example embodiment 82. The personal watercraft of example embodiment 81, wherein the complementary features include interlocking features at an interface between the upper wall and the battery enclosure.

Example embodiment 83. The personal watercraft of example embodiment 82, wherein the interlocking features include at least one groove extending into the upper wall of the flotation body and at least part of the battery enclosure received in the at least one groove.

Example embodiment 84. The personal watercraft of any one of example embodiments 78 to 83, wherein the flotation body has a tubing groove, and the personal watercraft has tubing received in the tubing groove.

Example embodiment 85. The personal watercraft of any one of example embodiments 78 to 84, wherein the flotation body includes a lower wall having a shape conforming to a shape of the hull.

Example embodiment 86. The personal watercraft of any one of example embodiments 78 to 85, wherein the flotation body includes a motor groove, the personal watercraft having an electric motor powered by the battery pack and received in the motor groove.

Example embodiment 87. The personal watercraft of any one of example embodiments 78 to 86, comprising a bow and a stern, the flotation body having a centroid located closer to the stern than to the bow.

Example embodiment 88. The personal watercraft of any one of example embodiments 78 to 87, wherein the hull comprises a side wall, the side wall includes a stern side wall portion at a stern of the personal watercraft, the side wall includes a bow side wall portion at a bow of the personal watercraft, the flotation body having a centroid located closer to the stern side wall portion than to the bow side wall portion.

Example embodiment 89. The personal watercraft of example embodiment 88, wherein the flotation body extends between a bow end of the flotation body and a stern end of the flotation body, a bow distance defined between the bow and the bow end, and a stern distance defined between the stern and the stern end, the bow distance being greater than the stern distance.

Example embodiment 90. The personal watercraft of any one of example embodiments 78 to 89, wherein the flotation body includes a foam material, the foam material having at least one property to dampen vibrations from the hull.

Example embodiment 91. The personal watercraft of example embodiment 90, wherein the foam material at least partially isolates the battery pack from the vibrations from the hull.

Example embodiment 92. The personal watercraft of any one of example embodiments 78 to 91, wherein the flotation body includes a notch to receive a drive shaft of the electric motor and/or to receive a water intake formed in a bottom wall of the hull.

Example embodiment 93. The personal watercraft of any one of example embodiments 78 to 92, comprising a bow and a stern and a center axis that extends between the bow and the stern, a length of the hull defined between the bow and the stern, the battery pack having a battery pack length defined along the center axis, the flotation body having a flotation body length defined along the center axis, at least one of the battery pack length and the flotation body length being between 25% and 100% of the length of the hull.

Example embodiment 94. The personal watercraft of any one of example embodiments 78 to 93, wherein the flotation body is positioned within the interior volume between the battery pack and a portion of a side wall of the hull.

Example embodiment 95. The personal watercraft of any one of example embodiments 78 to 94, wherein the battery pack rests on the flotation body and applies a load to the flotation body.

Example embodiment 96. The personal watercraft of any one of example embodiments 78 to 95, comprising an electric motor and an impeller configured to be driven by the electric motor to displace the personal watercraft, the battery pack configured to provide an electric current to the electric motor to drive the impeller, the electric current being the only energy provided to the electric motor.

Example embodiment 97. The personal watercraft of any one of example embodiments 78 to 96, wherein the flotation body is a unitary body.

Example embodiment 98. The personal watercraft of any one of example embodiments 78 to 97, wherein the flotation body includes at least one of polypropylene foam and polyurethane foam.

Example embodiment 99. The personal watercraft of any one of example embodiments 78 to 98, wherein the flotation body includes a sealed compartment.

Example embodiment 100. The personal watercraft of any one of example embodiments 78 to 99, wherein each battery module of the plurality of battery modules includes a plurality of battery cells.

Example embodiment 101. The personal watercraft of any one of example embodiments 78 to 100, comprising a straddle-seat.

Example embodiment 102. An emergency flotation device for a personal watercraft, comprising: a foam body positionable against a bottom wall of a hull of the personal watercraft between the bottom wall and a battery pack of the personal watercraft.

Example embodiment 103. A personal watercraft, comprising: a hull extending between a bow of the personal watercraft and a stern of the personal watercraft, the hull having defining an interior volume; and a flotation body positioned within the interior volume, the flotation body including a bow portion located at the bow and a stern portion located at the stern.

Example embodiment 104. A method of assembling a personal watercraft, the method comprising: placing a flotation body against a bottom of a hull of the personal watercraft; placing a battery pack with battery modules on top of the flotation body within the hull; and sealing the hull.

Example embodiment 105. The method of example embodiment 104, wherein placing the battery pack on top of the flotation body includes aligning an exterior of the battery pack with complementary features of the flotation body.

Example embodiment 106. The method of example embodiment 105, wherein aligning the exterior of the battery pack with the complementary features of the flotation body includes aligning the exterior of the battery pack with grooves extending into the flotation body.

Example embodiment 107. The method of any one of example embodiments 104 to 106, wherein prior to sealing the hull, the method includes collectively displacing the battery pack and the flotation body within the hull by sliding the flotation body against the bottom of the hull.

Example embodiment 108. A method of repairing or modifying a personal watercraft, the method comprising: removing components from within a hull of the personal watercraft; placing a flotation body against a bottom of the hull; and placing a battery pack on top of the flotation body within the hull.

The invention claimed is:

1. An electric personal watercraft, comprising:
a hull defining battery pack mounting pads and an interior volume of the personal watercraft;
a deck forming an upper portion of the personal watercraft, the hull and the deck enclosing the interior volume;
a battery pack including a plurality of battery modules for powering an electric motor, the battery pack positioned within the interior volume and fixedly attached to the battery pack mounting pads of the hull via at least one mount; and
a flotation body positioned within the interior volume between the battery pack and the hull, the flotation body and the battery pack including complementary features to position the battery pack within the hull.

2. The personal watercraft of claim 1, wherein the complementary features provide at least some lateral support for the battery pack.

3. The personal watercraft of claim 1, wherein the complementary features include at least one groove extending into the flotation body and at least a portion of an exterior of the battery pack received in the at least one groove.

4. The personal watercraft of claim 1, wherein the flotation body includes an upper wall, and the battery pack includes a battery enclosure housing the plurality of battery modules, the battery enclosure abutted against the upper wall of the flotation body.

5. The personal watercraft of claim 4, wherein the complementary features include interlocking features at an interface between the upper wall and the battery enclosure.

6. The personal watercraft of claim 5, wherein the interlocking features include at least one groove extending into the upper wall of the flotation body and at least part of the battery enclosure received in the at least one groove.

7. An electric personal watercraft, comprising:
a hull defining battery pack mounting pads and having a bottom wall and a side wall extending upwardly from the bottom wall, the bottom and side walls defining an interior volume of the hull;
a deck forming an upper portion of the personal watercraft, the hull and the deck enclosing the interior volume;
a battery pack including a plurality of battery modules for powering an electric motor, the battery pack positioned within the interior volume and fixedly attached to the battery pack mounting pads of the hull via at least one mount; and
a flotation body positioned within the interior volume between the battery pack and at least one of the bottom wall of the hull and the side wall of the hull.

8. The personal watercraft of claim 7, wherein the flotation body includes a foam material.

9. The personal watercraft of claim 8, wherein the foam material at least partially isolates the battery pack from vibrations from the hull.

10. The personal watercraft of claim 7, wherein the flotation body includes a lower wall having a shape at least partially conforming to a shape of the bottom wall of the hull.

11. The personal watercraft of claim 7, wherein the flotation body includes an upper wall, and the personal watercraft includes an electric motor powered by the battery pack, the electric motor abutting the upper wall of the flotation body.

12. The personal watercraft of claim 11, wherein the upper wall has at least one groove, the electric motor received in the at least one groove.

13. The personal watercraft of claim 11, wherein the flotation body includes a notch to receive a drive shaft of the electric motor.

14. The personal watercraft of claim 7, wherein the flotation body is positioned within the interior volume between the battery pack and a portion of the side wall of the hull.

15. The personal watercraft of claim 7, wherein the battery pack rests on the flotation body and applies a load to the flotation body.

16. The personal watercraft of claim 7, wherein the flotation body is a unitary body.

17. The personal watercraft of claim 7, comprising a straddle-seat.

18. A personal watercraft, comprising:
a hull extending between a bow of the personal watercraft and a stern of the personal watercraft, the hull defining an interior volume;
a battery pack including a plurality of battery modules, the battery pack positioned within the interior volume; and
a flotation body positioned within the interior volume vertically between the battery pack and the hull, the flotation body having a centroid located closer to the stern than to the bow.

19. The personal watercraft of claim 18, wherein the hull includes a side wall being substantially upright, the side wall having a stern side wall portion at the stern, the side wall having a bow side wall portion at the bow, the centroid of the flotation body located closer to the stern side wall portion than to the bow side wall portion.

20. The personal watercraft of claim 18, wherein the flotation body extends between a bow end of the flotation body and a stern end of the flotation body, a bow distance defined between the bow and the bow end, and a stern distance defined between the stern and the stern end, the bow distance being greater than the stern distance.

\* \* \* \* \*